United States Patent
Nishida et al.

(10) Patent No.: US 7,612,000 B2
(45) Date of Patent: *Nov. 3, 2009

(54) MODACRYLIC SHRINKABLE FIBER AND METHOD FOR MANUFACTURING THE SAME

(75) Inventors: Sohei Nishida, Hyogo (JP); Kohei Kawamura, Hyogo (JP); Toshiaki Ebisu, Hyogo (JP)

(73) Assignee: Kaneka Corporation, Osaka (JP)

( * ) Notice: Subject to any disclaimer, the term of this patent is extended or adjusted under 35 U.S.C. 154(b) by 7 days.

This patent is subject to a terminal disclaimer.

(21) Appl. No.: 11/632,604

(22) PCT Filed: Jul. 8, 2005

(86) PCT No.: PCT/JP2005/012695

§ 371 (c)(1),
(2), (4) Date: Jan. 16, 2007

(87) PCT Pub. No.: WO2006/008990

PCT Pub. Date: Jan. 26, 2006

(65) Prior Publication Data

US 2007/0243377 A1    Oct. 18, 2007

(30) Foreign Application Priority Data

Jul. 16, 2004   (JP)   ............................. 2004-210524
Apr. 28, 2005   (JP)   ............................. 2005-132819

(51) Int. Cl.
  D04H 1/00   (2006.01)
  D04H 3/00   (2006.01)
  D04H 5/00   (2006.01)

(52) U.S. Cl. .................. 442/363; 428/364; 428/373; 428/374; 525/191

(58) Field of Classification Search ................ 442/363; 428/364, 373, 374

See application file for complete search history.

(56) References Cited

U.S. PATENT DOCUMENTS

| 4,383,086 A | 5/1983 | Fester et al. |
| 2007/0074353 A1 * | 4/2007 | Kuroda et al. .............. 8/115.51 |

FOREIGN PATENT DOCUMENTS

| EP | 1 698 718 |   | 9/2006 |
| EP | 1 698 719 |   | 9/2006 |
| JP | 59036720 | * | 2/1984 |
| JP | 60-110911 |   | 6/1985 |
| JP | 62057912 | * | 3/1987 |
| JP | 1-052812 |   | 2/1989 |
| JP | 2182916 | * | 7/1990 |
| JP | 2277810 | * | 11/1990 |
| JP | 6-158422 |   | 6/1994 |
| JP | 2001-303364 |   | 10/2001 |
| JP | 2003-253574 |   | 9/2003 |
| JP | 2003-435851 |   | 12/2003 |
| JP | 2005-194324 |   | 7/2005 |
| WO | 02/053825 |   | 7/2002 |

* cited by examiner

Primary Examiner—Norca L Torres-Velazquez
(74) Attorney, Agent, or Firm—Hamre, Schumann, Mueller & Larson, P.C.

(57) ABSTRACT

A modacrylic shrinkable fiber according to the present invention is containing a polymer composition obtained by mixing 50 to 99 parts by weight of a polymer (A) containing 40 wt % to 80 wt % of acrylonitrile, 20 wt % to 60 wt % of a halogen-ontaining monomer and 0 wt % to 5 wt % of a sulfonic-acid-containing monomer, and 1 to 50 parts by weight of a polymer (B) containing 5 wt % to 70 wt % of acrylonitrile, 20 wt % to 94 wt % of an acrylic ester and 1 wt % to 40 wt % of a sulfonic-acid-containing monomer containing a methallyl-sulfonic acid or metal salts thereof or amine salts thereof, in which a total amount of the polymer (A) and the polymer (B) is 100 parts by weight. In this way, a modacrylic shrinkable fiber that has a favorable color development property after dyeing and a high shrinkage ratio even after dyeing is obtained.

12 Claims, No Drawings

MODACRYLIC SHRINKABLE FIBER AND METHOD FOR MANUFACTURING THE SAME

TECHNICAL FIELD

The present invention relates to a modacrylic highly-shrinkable fiber that has a favorable color development property after dyeing and a high shrinkage ratio even after dyeing, and a method for manufacturing the same.

BACKGROUND ART

Conventionally, modacrylic fibers have a hand like animal fur and, owing to such characteristics, have been used for standing hair products such as toys and clothing. In particular, for the purpose of providing the feeling of standing hairs and a natural external appearance, a down hair portion is formed of shrinkable fibers and a guard hair portion is formed of non-shrinkable fibers for external appearance in many cases.

Pile fabrics need to have a good external appearance, so that the shrinkable fibers also have to have various hues. However, since the shrinkable fibers shrink due to heat history incurred during a dyeing process, there currently are only the fibers whose hues are limited to those colored in a spinning process.

So far, highly-shrinkable acrylonitrile-based synthetic fibers have been obtained from a copolymer formed of 30 wt % to 58 wt % of acrylonitrile, 70 wt % to 42 wt % of vinylidene chloride and vinyl chloride and 0 wt % to 10 wt % of at least one kind of ethylenic unsaturated monomer (see Patent document 1). However, according to the knowledge of the inventors of the present invention, the above-noted shrinkable fibers shrink in dyeing at 70° C. or higher and no longer shrink greatly by the heat in a tentering process, in which an adhesive is applied to a back surface of a pile and dried, during pile processing. Further, although it is possible to suppress the shrinkage by dyeing at a temperature lower than 70° C. and allow the fibers to shrink by the heat in the tentering process, sufficient dye-affinity cannot be achieved. Patent document 1: JP 60(1985)-110911 A

DISCLOSURE OF INVENTION

Problem to be Solved by the Invention

Accordingly, the present invention solves the above-described problems of the conventional technology and achieves a modacrylic shrinkable fiber that has a high shrinkage ratio even after dyeing and a favorable color development property.

Means for Solving Problem

A modacrylic shrinkable fiber according to the present invention is containing a polymer composition obtained by mixing 50 to 99 parts by weight of a polymer (A) containing 40 wt % to 80 wt % of acrylonitrile, 20 wt % to 60 wt % of a halogen-containing monomer and 0 wt % to 5 wt % of a sulfonic-acid-containing monomer, and 1 to 50 parts by weight of a polymer (B) containing 5 wt % to 70 wt % of acrylonitrile, 20 wt % to 94 wt % of an acrylic ester and 1 wt % to 40 wt % of a sulfonic-acid-containing monomer containing a methallylsulfonic acid or metal salts thereof or amine salts thereof, in which a total amount of the polymer (A) and the polymer (B) is 100 parts by weight.

In the present invention, it is preferable that the methallylsulfonic acid or the metal salts thereof or the amine salts thereof in the polymer (B) is sodium methallylsulfonate.

Also, it is preferable to contain 0.01 wt % to 10 wt % of sodium methallylsulfonate in the polymer (B).

Further, it is preferable to contain 0.1 wt % to 3 wt % of sodium methallylsulfonate in the polymer (B).

Moreover, it is preferable that a relative saturation value at 70° C. is at least 0.8.

In a method for manufacturing a modacrylic shrinkable fiber according to the present invention, spinning is performed using a spinning solution obtained by dissolving in acetone 50 to 99 parts by weight of a polymer (A) containing 40 wt % to 80 wt % of acrylonitrile, 20 wt % to 60 wt % of a halogen-containing monomer and 0 wt % to 5 wt % of a sulfonic-acid-containing monomer, and 1 to 50 parts by weight of a polymer (B) containing 5 wt % to 70 wt % of acrylonitrile, 20 wt % to 94 wt % of an acrylic ester and 1 wt % to 40 wt % of a sulfonic-acid-containing monomer containing a methallylsulfonic acid or metal salts thereof or amine salts thereof, in which a total amount of the polymer (A) and the polymer (B) is 100 parts by weight.

In the manufacturing method according to the present invention, water may be dissolved further in the acetone. In other words, it also may be possible to perform spinning using the spinning solution obtained by dissolving the polymer (A) and the polymer (B) in a mixed solution of water and acetone.

Effects of the Invention

In accordance with the present invention, it is possible to achieve a modacrylic shrinkable fiber that can be dyed and has a favorable color development property. Also, a modacrylic shrinkable fiber according to the present invention does not shrink very much at the time of dyeing and has a high shrinkage ratio even after the dyeing, thus allowing new product planning for clothing, toys (such as stuffed toys) and interior decoration.

DESCRIPTION OF THE INVENTION

In the invention according to Japanese Patent Application No. 2003-435851, which is not published at the time the present application is filed, a shrinkable fiber that can be dyed is obtained by spinning a spinning solution of a polymer composition obtained by mixing 50 to 99 parts by weight of a polymer (X) containing at least 40 wt % to 80 wt % of acrylonitrile, 20 wt % to 60 wt % of a halogen-containing monomer and 0 wt % to 5 wt % of a sulfonic-acid-containing monomer for the purpose of improving a low-temperature dye-affinity and 1 to 50 parts by weight of a polymer (Y) containing 5 wt % to 70 wt % of acrylonitrile with a high dye-affinity and 1 wt % to 40 wt % of other copolymerizable monomer(s), in which the polymer (X) and the polymer (Y) are incompatible with each other.

The invention according to Japanese Patent Application No. 2003-435851 is characterized in that the shrinkable fiber that shrinks by at least 20% after dyeing is obtained by enhancing the dye-affinity at low temperatures so as to suppress a shrinkage ratio during dyeing. However, in the invention of the present application, it was found that copolymerization of sodium methallylsulfonate at the time of polymerizing the polymer (Y) with the polymer (X) made it possible not only to achieve the characteristics of the invention according to Japanese Patent Application No. 2003-435851 but also to obtain a modacrylic fiber that has a high shrinkage ratio even after dyeing and a favorable color development property by adjusting the degree of incompatibility between the polymer (X) and the polymer (Y).

In the polymer (A) of the present invention, it is preferable to use 40 wt % to 80 wt % of acrylonitrile. When the acrylonitrile content is less than 40 wt %, the resultant fiber has low heat resistance. Also, when the acrylonitrile content exceeds 80 wt %, the heat resistance becomes so high that sufficient dye-affinity and shrinkage ratio cannot be achieved.

In the polymer (A) of the present invention, the halogen-containing monomer preferably is selected from vinyl halides and vinylidene halides represented by vinyl chloride, vinylidene chloride, vinyl bromide, vinylidene bromide, etc., and can be one kind or a mixture of two or more kinds of the above. The content of this halogen-containing monomer in the polymer (A) preferably is equal to or more than 20 wt % in order to provide the fiber with a favorable touch without roughness and preferably is equal to or less than 60 wt % in order to achieve a low hydrophobicity for sufficient dye-affinity. Thus, 20 wt % to 60 wt % is preferable.

In the polymer (A) of the present invention, the sulfonic-acid-containing monomer preferably is selected from an allylsulfonic acid, a methallylsulfonic acid, a styrenesulfonic acid, an isoprenesulfonic acid and a 2-acrylamido-2-methylpropanesulfonic acid, or metal salts thereof and amine salts thereof, and can be one kind or a mixture of two or more kinds of the above. It is preferable that the content of the sulfonic-acid-containing monomer in the polymer (A) of the present invention is equal to or less than 5 wt % in order to prevent a decrease in strength due to the generation of voids or agglutination in the fiber.

The content of acrylonitrile in the polymer (B) of the present invention preferably is equal to or more than 5 wt % in order to maintain the heat resistance of the fiber and preferably is equal to or less than 70 wt % in order to suppress the generation of voids in the fiber. Thus, 5 wt % to 70 wt % is preferable.

In the polymer (B) of the present invention, the acrylic ester preferably is methyl acrylate, ethyl acrylate, butyl acrylate, etc., and these monomers can be used alone or as a mixture of two or more kinds.

The content of the acrylic ester in the polymer (B) of the present invention preferably is equal to or more than 20 wt % in order to achieve sufficient dye-affinity and preferably is equal to or less than 94 wt % in order to prevent the generation of voids or agglutination in the fiber. Thus, 20 wt % to 94 wt % is preferable.

In the polymer (B) of the present invention, the sulfonic-acid-containing monomer preferably is selected from an allylsulfonic acid, a methallylsulfonic acid, a styrenesulfonic acid, an isoprenesulfonic acid and a 2-acrylamido-2-methylpropanesulfonic acid, or metal salts thereof and amine salts thereof, and can be one kind or a mixture of two or more kinds of the above. Incidentally, among these sulfonic-acid-containing monomers, "a methallylsulfonic acid or metal salts thereof or amine salts thereof" are essential components in the polymer (B) of the present invention and are used in combination with the other sulfonic-acid-containing monomers. Further, "a methallylsulfonic acid or metal salts thereof or amine salts thereof" serving as the essential components in the invention of the present application preferably is "a methallylsulfonic acid or metal salts thereof", more preferably is "metal salts of a methallylsulfonic acid" and particularly preferably is "sodium methallylsulfonate".

The content of the sulfonic-acid-containing monomer in the polymer (B) of the present invention preferably is equal to or more than 1 wt % in order not to lower the dye-affinity and preferably is equal to or less than 40 wt % in order to prevent a decrease in strength due to the generation of voids or agglutination in the fiber. Thus, 1 wt % to 40 wt % is preferable.

Since the polymer (A) and the polymer (B) of the present invention are incompatible with each other, they are considered to have a so-called sea-island structure, which is a phase separation structure with the polymer (A), which is present at a higher ratio in the fiber, being the matrix (sea) and the polymer (B), which is present at a lower ratio therein, being the domain (islands). Accordingly, the polymer (B) is not present continuously in the fiber. Therefore, although the polymer (B) has a low heat resistance, it does not have a significant influence on the shrinking behavior. Further, since the polymer (B) contains a sulfonic group serving as a part to which the dye is bonded and the acrylic ester having a low softening point, it is possible to provide the fiber with high dye-affinity.

In other words, the modacrylic shrinkable fiber according to the present invention has both of the property of not shrinking greatly even when dyed at a temperature equal to or lower than 80° C. and the property of being capable of dyeing modacrylic fibers, which conventionally have been dyeable in deep colors only at a temperature higher than 80° C., in deep colors at a temperature equal to or lower than 80° C., thereby making it possible to dye modacrylic fibers, which have not been dyeable conventionally.

The state of incompatibility referred to in the present invention can be observed in the spinning solution prepared by mixing the polymer (A) and the polymer (B). The polymer (A) and the polymer (B) have a sea-island structure with the polymer (A) being the sea and the polymer (B) being the islands also in the spinning solution, and the polymer (B) is present in a granular state due to phase separation. Further, it is possible to determine the degree of incompatibility by the grain size of the granular polymer (B).

The inventors of the present invention conducted keen studies and found that there was a relationship between the degree of incompatibility, namely, the grain size of the polymer (B) in the spinning solution prepared by mixing the polymer (A) and the polymer (B) and the color development property.

The above-noted relationship is as follows: the color development property is deteriorated with an increase in the grain size of the polymer (B) in the spinning solution, and the color development property improves with a decrease in the grain size of the polymer (B) in the spinning solution.

In fibers spun out of the spinning solution containing the polymer (B) with a large grain size, voids are generated easily in a coagulation step of spinning and tend to cause deterioration of the color development property. Conversely, in fibers spun out of the spinning solution containing the polymer (B) with a small grain size, voids are not generated easily in the coagulation process of spinning, so that fine fibers are obtained easily and fibers with favorable color development property are obtained easily.

However, when the grain size of the polymer (B) in the spinning solution is too small, fibers become so fine that the dye cannot infiltrate into the fibers easily. Thus, a dyeing exhaustion rate tends to lower.

Moreover, the inventors of the present invention conducted keen studies and found that it was possible to adjust the grain size of the polymer (B) in the spinning solution by the copolymerization amount of sodium methallylsulfonate.

The grain size of the polymer (B) in the spinning solution tends to decrease with an increase in the copolymerization amount of sodium methallylsulfonate, and it tends to increase with a decrease in the copolymerization amount of sodium methallylsulfonate.

More specifically, in the polymer (B) of the present invention, the content of sodium methallylsulfonate preferably is 0.01 wt % to 10 wt % and particularly preferably is 0.1 wt % to 3 wt %. In terms of the dye-affinity of the fiber, when the content of sodium methallylsulfonate is 0.01 wt % to 10 wt %, voids are less likely to be generated in the fiber, so that a fine fiber is obtained, making it possible to achieve a modacrylic shrinkable fiber that has favorable dyeing exhaustion rate and color development property. Furthermore, when the content of sodium methallylsulfonate is 0.1 wt % to 3 wt %, voids are less likely to be generated in the fiber, so that a finer fiber is obtained, making it possible to achieve a modacrylic fiber that has more favorable dyeing exhaustion rate and color development property. Also, in terms of the shrinkability of the fiber, when the content of sodium methallylsulfonate is 0.1 wt % to 3 wt %, voids become unlikely to be generated in the fiber, which results in favorable color development property, as well as making it possible to keep a preferable dispersion size, so that a favorable modacrylic fiber can be achieved.

The polymer (A) and the polymer (B) of the present invention can be obtained using any of known compounds, for example, peroxide compounds, azo compounds or various redox compounds as a polymerization initiator by a regular vinyl polymerization method such as emulsion polymerization, suspension polymerization or solution polymerization.

Concerning the mixing ratio of the polymer (A) and the polymer (B) in the present invention, the ratio of the polymer (B) less than 1 part by weight with respect to 100 parts by weight of the total amount of the polymer (A) and the polymer (B) is not preferable because sufficient dye-affinity cannot be achieved, whereas the ratio exceeding 50 parts by weight is not preferable because voids or agglutination are generated in the fiber, resulting in lower strength and dye-affinity.

The method for manufacturing a modacrylic shrinkable fiber according to the present invention includes extrusion from a nozzle by regular wet spinning in dimethylformamide (DMF) or acetone or dry spinning, followed by drawing and drying. If necessary, further drawing and heat treatment also may be carried out. The resultant fibers are drawn by 1.3 to 4.0 times at 70° C. to 140° C., thereby obtaining shrinkable fibers. Among them, for the modacrylic shrinkable fiber according to the present invention, it is preferable that a spinning solution is prepared by dissolving the polymer (A) and the polymer (B) in acetone. It is further preferable that a spinning solution is prepared by dissolving the polymer (A) and the polymer (B) in a mixed solution of water and acetone. This is preferable because a highly hydrophilic polymer (B) is dissolved more easily in an acetone/water system obtained by the addition of water, voids are less likely to be generated and better dye-affinity and shrinkability are achieved.

In the case of dissolving the polymers (A) and (B) in the mixed solution of water and acetone, the content of water preferably is 0.01 wt % to 50 wt % and more preferably is 0.1 wt % to 10 wt % with respect to the spinning solution.

As this spinning solution, an inorganic and/or organic pigment such as titanium oxide or coloring pigments, a stabilizing agent effective in rust prevention, coloring and spinning or weatherability, or the like also can be used as long as it does not impair the spinning.

Incidentally, the color development property referred to in the present invention indicates how deep the color develops when fibers are dyed. When the fibers contain only a few voids, the color develops deeply after dyeing, resulting in a favorable color development property. On the other hand, in the case where the fibers contain many voids, a whitish color develops after dyeing, resulting in a poor color development property. The evaluations were made as follows.

The degree of color development property of fibers dyed using a dye of 0.5% omf Maxilon Red GRL (manufactured by Ciba Specialty Chemicals.) and a dyeing assistant of 0.5 g/L Ultra MT #100 (manufactured by Mitejima Chemical Co., Ltd.) at 70° C. for 60 minutes was evaluated by a sensory test on a scale of A to C as follows from visual and sensory points of view.

As a reference sample having a favorable color development property, fibers obtained by dyeing "Kanecaron (registered trademark)" SE having a fineness of 3.3 dtex and a length of 38 mm (manufactured by KANEKA CORPORATION) using the dye of 0.5 % omf Maxilon Red GRL (manufactured by Ciba Specialty Chemicals.) and the dyeing assistant of 0.5 g/L Ultra MT #100 (manufactured by Mitejima Chemical Co., Ltd.) at 100° C. for 60 minutes were used.

A: color development property equivalent to reference sample
B: slightly poorer color development property (developing slightly whitish color) compared with reference sample
C: poor color development property (developing whitish color) compared with reference sample The post-dyeing shrinkage ratio referred to in the present invention indicates how much fibers that have been dyed shrink in a tentering process, and is calculated as follows. After a fiber having a post-dyeing length of Ldo was treated using a furnace at 130° C. for 5 minutes, the length Ld of the fiber was measured. Then, the post-dyeing shrinkage ratio was calculated by the equation below.

$$\text{Post-dyeing shrinkage ratio (\%)} = ((Ldo-Ld)/Ldo) \times 100$$

The modacrylic shrinkable fiber according to the present invention was allowed to shrink in the tentering process during pile processing. Since the tentering process was conducted in dry heat at about 130° C., the post-dyeing shrinkage ratio was determined in dry heat at 130° C.

When the post-dyeing shrinkage ratio was lower than 20%, the processed pile fabric had small height difference between the modacrylic shrinkable fiber according to the present invention and non-shrinkable raw cotton. Therefore, the height difference was not emphasized, so that it was not possible to obtain a pile fabric having natural or fancy external appearance characteristics.

The relative saturation value referred to in the present invention indicates a fiber's capability of being dyed, and was calculated as follows. The fiber was dyed at a predetermined temperature for 60 minutes using a supersaturated amount of Malachite Green so as to determine a saturated dyeing capacity, and then the relative saturation value was calculated from the saturated dyeing capacity. The saturated dyeing capacity and the relative saturation value were calculated by the equations below.

$$\text{Saturated dyeing capacity} = ((Ao-A)/Ao) \times 2.5$$

A: absorbance of dyebath after dyeing (618 nm)
Ao: absorbance of dyebath before dyeing (618 nm)

$$\text{Relative saturation value} = \text{Saturated dyeing capacity} \times 400/463$$

Color developed when a modacrylic fiber, for example, "Kanecaron (registered trademark)" SE having a fineness of 3.3 dtex and a length of 38 mm (manufactured by KANEKA CORPORATION) exhausts about 0.5 % omf of the dye of Maxilon Red GRL (manufactured by Ciba Specialty Chemicals.) is expressed as faint color, color developed when it exhausts about 1% omf of the above-noted dye is expressed as medium deep color, and color developed when it exhausts about 2% omf of the above-noted dye is expressed as deep color. The modacrylic shrinkable fiber according to the present invention was capable of being dyed in deep color at a relative saturation value of at least 0.8 and thus dyed in almost all colors used in the market. Therefore, the relative saturation of at least 0.8 is preferable. Before the description of examples, a method for evaluating a performance of fibers under test, etc. will be detailed in the following.

(1) Production of High Pile

After shrinkable fibers and non-shrinkable fibers were blended and subjected to humidity control, slivers were produced using an opener manufactured by Kodama Tech Co. Ltd. and a carding machine manufactured by Howa Machinery Ltd. Nagoya. Next, sliver knitting was carried out with a high pile knitting machine manufactured by Mayer & Cie., and a pile portion was cut to align pile lengths with a shirring machine manufactured by Iwakura Seiki K. K. Subsequently, an acrylic ester-based adhesive was applied to a back surface of the pile, and the shrinkable fibers were allowed to shrink while drying the adhesive using a tentering machine manufactured by HIRANO TECSEED Co., Ltd. at 130° C. for 5 minutes. Thereafter, polisher finishing and shirring were carried out with a polisher machine and the shirring machine manufactured by Iwakura Seiki K. K., thus obtaining a high pile.

(2) Evaluation of External Appearance of High Pile

With respect to the pile fabric with a height difference produced as in (1) above, the degree of external appearance characteristics in which the height difference between a long pile portion and a short pile portion was emphasized was evaluated by a sensory test on a scale of a to d as follows from visual and sensory points of view.

a: pile fabric with height difference having external appearance characteristics in which the height difference between long pile portion and short pile portion was emphasized considerably b: pile fabric with height difference having external appearance characteristics in which the height difference between long pile portion and short pile portion was emphasized c: pile fabric with height difference in which the height difference between long pile portion and short pile portion was not emphasized very much d: pile fabric with height difference in which the height difference between long pile portion and short pile portion hardly was observed In general, the external appearance characteristics with emphasized height difference are provided when the height difference between the long pile portion and the short pile portion is equal to or larger than 3 mm, and the external appearance characteristics with considerably emphasized height difference are provided when the height difference between them is equal to or larger than 4 mm. Also, the height difference between these portions smaller than 3 mm results in the height difference that is not emphasized very much, and that equal to or smaller than 2 mm results in substantially no observed height difference.

In the following, the examples will be described. Parts and % in the examples respectively mean parts by weight and wt % unless otherwise specified.

EXAMPLES

Manufacturing Example 1

In a pressure-resistant polymerization reactor with a capacity of 20 L, 12000 g of ion-exchange water, 54 g of sodium lauryl sulfate, 25.8 g of sulfurous acid, 13.2 g of sodium hydrogen sulfite, 0.06 g of iron sulfate, 294 g of acrylonitrile (hereinafter, referred to as AN) and 3150 g of vinyl chloride (hereinafter, referred to as VC) were put and substituted with a nitrogen atmosphere. The temperature in the reactor was adjusted to 50° C., and 2.1 g of ammonium persulfate serving as an initiator was placed therein, thus starting polymerization. The polymerization was performed for 5 hours and 10 minutes while adding 2526 g of AN, 30 g of sodium styrenesulfonate (hereinafter, referred to as 3S) and 13.8 g of ammonium persulfate. Thereafter, unreacted VC was collected, and latex was cleared from the reactor, followed by salting out, heat treatment, filtering, washing with water, dewatering and drying, thus obtaining a polymer 1.

Next, in a pressure-resistant polymerization reactor with a capacity of 5 L, 1400 g of acetone, 930 g of water, 150 g of AN, 540 g of methyl acrylate (hereinafter, referred to as MA), 300 g of sodium 2-acrylamido-2-methylpropanesulfonate (hereinafter, referred to as SAM) and 10 g of sodium methallylsulfonate (hereinafter, referred to as MX) were put and substituted with a nitrogen atmosphere. The temperature in the reactor was adjusted to 55° C., and 5 g of 2,2'-azobis(2,4-dimethylvaleronitrile) serving as an initiator was placed therein, thus starting polymerization. The polymerization was performed for 16 hours while adding 10 g of 2,2'-azobis (2,4-dimethylvaleronitrile), followed by heating to 70° C. and polymerization for 6 hours, thus obtaining a solution of a polymer 2 having a polymer concentration of 30 wt %. A spinning solution was prepared by mixing the solution of the polymer 2 in a solution of the polymer 1, in which the polymer 1 was dissolved in acetone so as to achieve 30 wt % polymer 1 concentration, such that the weight ratio of polymer 1: polymer 2=96:4. The resultant spinning solution was extruded through a 0.08 mmφ spinneret having 8500 holes into a 30 wt % acetone aqueous solution at 25° C. and further drawn by 2.0 times in a 20 wt % acetone aqueous solution at 25° C., followed by washing with water at 60° C. Then, the fibers were dried at 130° C. and further drawn by 1.8 times at 105° C., thus obtaining 4.4 dtex drawn fibers.

Subsequently, the resultant shrinkable fibers were provided with crimps and cut to 32 mm, and then dyed using the dye of 0.5% omf Maxilon Red GRL (manufactured by Ciba Specialty Chemicals.) and the dyeing assistant of 0.5 g/L Ultra MT #100 (manufactured by Mitejima Chemical Co., Ltd.) at 70° C. for 60 minutes. Then, 70 wt % of the dyed fibers and 30 wt % of "Kanecaron (registered trademark)" RCL having a fineness of 12.2 dtex and a length of 44 mm (manufactured by KANEKA CORPORATION), which was a non-shrinkable raw cotton, were blended so as to produce a high pile. Thereafter, the pile was cut to have a length of 15 mm in shirring after sliver knitting, and the pile was cut to have a length of 18 mm after polisher finishing, thus obtaining a high pile.

Manufacturing Example 2

In a pressure-resistant polymerization reactor with a capacity of 5 L, 1400 g of acetone, 930 g of water, 150 g of AN, 545 g of MA, 300 g of SAM and 5 g of MX were put and polymerized by a method similar to that for the polymer 2 in Manufacturing Example 1, thus obtaining a solution of a polymer 3. A spinning solution was prepared by mixing the solution of the polymer 3 in the solution of the polymer 1 obtained in Manufacturing Example 1, in which the polymer 1 was dissolved in acetone so as to achieve 30 wt % polymer 1 concentration, such that the weight ratio of polymer 1:polymer 3=96:4. The resultant spinning solution was spun using a method similar to that in Manufacturing Example 1, thus obtaining drawn fibers. From the obtained drawn fibers, a high pile was produced using a method similar to that in Manufacturing Example 1.

Manufacturing Example 3

In a pressure-resistant polymerization reactor with a capacity of 5 L, 1400 g of acetone, 930 g of water, 300 g of AN, 390 g of MA, 300 g of SAM and 10 g of MX were put and polymerized by a method similar to that for the polymer 2 in Manufacturing Example 1, thus obtaining a solution of a polymer 4. A spinning solution was prepared by mixing the solution of the polymer 4 in the solution of the polymer 1 obtained in Manufacturing Example 1, in which the polymer 1 was dissolved in acetone so as to achieve 30 wt % polymer 1 concentration, such that the weight ratio of polymer 1:polymer 4=96:4. The resultant spinning solution was spun using a method similar to that in Manufacturing Example 1, thus obtaining drawn fibers. From the obtained drawn fibers, a high pile was produced using a method similar to that in Manufacturing Example 1.

Manufacturing Example 4

In a pressure-resistant polymerization reactor with a capacity of 5 L, 1870 g of acetone, 470 g of water, 150 g of AN, 690 g of MA, 150 g of SAM and 10 g of MX were put and polymerized by a method similar to that for the polymer 2 in Manufacturing Example 1, thus obtaining a solution of a polymer 5. A spinning solution was prepared by mixing the solution of the polymer 5 in the solution of the polymer 1 obtained in Manufacturing Example 1, in which the polymer 1 was dissolved in acetone so as to achieve 30 wt % polymer 1 concentration, such that the weight ratio of polymer 1:polymer 5=90:10. The resultant spinning solution was spun using a method similar to that in Manufacturing Example 1, thus obtaining drawn fibers. From the obtained drawn fibers, a high pile was produced using a method similar to that in Manufacturing Example 1.

Manufacturing Example 5

In a pressure-resistant polymerization reactor with a capacity of 5 L, 1400 g of acetone, 930 g of water, 150 g of AN, 510 g of MA, 300 g of SAM and 40 g of MX were put and polymerized by a method similar to that for the polymer 2 in Manufacturing Example 1, thus obtaining a solution of a polymer 6. A spinning solution was prepared by mixing the solution of the polymer 6 in the solution of the polymer 1 obtained in Manufacturing Example 1, in which the polymer 1 was dissolved in acetone so as to achieve 30 wt % polymer 1 concentration, such that the weight ratio of polymer 1:polymer 6=96:4. The resultant spinning solution was spun using a method similar to that in Manufacturing Example 1, thus obtaining drawn fibers. From the obtained drawn fibers, a high pile was produced using a method similar to that in Manufacturing Example 1.

Manufacturing Example 6

In a pressure-resistant polymerization reactor with a capacity of 5 L, 1400 g of acetone, 930 g of water, 150 g of AN, 550 g of MA and 300 g of SAM were put and polymerized by a method similar to that for the polymer 2 in Manufacturing Example 1, thus obtaining a solution of a polymer 7. A spinning solution was prepared by mixing the solution of the polymer 7 in the solution of the polymer 1 obtained in Manufacturing Example 1, in which the polymer 1 was dissolved in acetone so as to achieve 30 wt % polymer 1 concentration, such that the weight ratio of polymer 1:polymer 7=96:4. The resultant spinning solution was spun using a method similar to that in Manufacturing Example 1, thus obtaining drawn fibers. From the obtained drawn fibers, a high pile was produced using a method similar to that in Manufacturing Example 1.

Table 1 shows the methods for manufacturing the fibers obtained in Manufacturing Examples 1 to 6.

TABLE 1

| | Base polymer composition | | Blend polymer composition | | Blend composition Base polymer/Blend polymer |
|---|---|---|---|---|---|
| Manufacturing Ex. 1 | Polymer 1 | $AN^{47}$-$VC^{52.5}$-$3S^{0.5}$ | Polymer 2 | $AN^{15}$-$MA^{54}$-$SAM^{30}$-$MX^{1}$ | 96/4 |
| Manufacturing Ex. 2 | Polymer 1 | $AN^{47}$-$VC^{52.5}$-$3S^{0.5}$ | Polymer 3 | $AN^{15}$-$MA^{54.5}$-$SAM^{30}$-$MX^{0.5}$ | 96/4 |
| Manufacturing Ex. 3 | Polymer 1 | $AN^{47}$-$VC^{52.5}$-$3S^{0.5}$ | Polymer 4 | $AN^{30}$-$MA^{39}$-$SAM^{30}$-$MX^{1}$ | 96/4 |
| Manufacturing Ex. 4 | Polymer 1 | $AN^{47}$-$VC^{52.5}$-$3S^{0.5}$ | Polymer 5 | $AN^{15}$-$MA^{69}$-$SAM^{15}$-$MX^{1}$ | 90/10 |
| Manufacturing Ex. 5 | Polymer 1 | $AN^{47}$-$VC^{52.5}$-$3S^{0.5}$ | Polymer 6 | $AN^{15}$-$MA^{51}$-$SAM^{30}$-$MX^{4}$ | 96/4 |
| Manufacturing Ex. 6 | Polymer 1 | $AN^{47}$-$VC^{52.5}$-$3S^{0.5}$ | Polymer 7 | $AN^{15}$-$MA^{55}$-$SAM^{30}$ | 96/4 |

(Note)
Numerical values indicate wt %.
AN: acrylonitrile
VC: vinyl chloride
3S: sodium styrenesulfonate
MA: methyl acrylate
SAM: sodium 2-acrylamido-2-methylpropanesulfonate
MX: sodium methallylsulfonate

Examples 1 to 4

Table 2 shows the color development property, relative saturation value, post-dyeing shrinkage ratio and evaluation of pile external appearance of the shrinkable fibers obtained in Manufacturing Examples 1 to 4.

TABLE 2

|  | Manufacturing method | Color development property | Relative saturation value dyed at 70° C. | Post-dyeing shrinkage ratio dyed at 70° C. (%) | Evaluation of high pile external appearance |
|---|---|---|---|---|---|
| Ex. 1 | Manufacturing Ex. 1 | A | 0.9 | 31 | a |
| Ex. 2 | Manufacturing Ex. 2 | A | 0.9 | 32 | a |
| Ex. 3 | Manufacturing Ex. 3 | A | 0.9 | 31 | a |
| Ex. 4 | Manufacturing Ex. 4 | A | 0.9 | 31 | a |
| Ex. 5 | Manufacturing Ex. 5 | A | 0.4 | 32 | a |
| Comp. Ex. 1 | Manufacturing Ex. 6 | C | 0.9 | 31 | a |

Shrinkable fibers respectively obtained by mixing the polymers 2 to 5 containing 0.1 wt % to 3 wt % of sodium methallylsulfonate followed by spinning had a favorable color development property and had a relative saturation value of at least 0.8, allowing dyeing into any color from faint colors to deep colors. Furthermore, it was possible to obtain the high pile having a post-dyeing shrinkage ratio of equal to or larger than 20% and external appearance characteristics in which the height difference between the long pile portion and the short pile portion was emphasized.

Example 5

Table 2 shows the color development property, relative saturation value, post-dyeing shrinkage ratio and evaluation of pile external appearance of the shrinkable fibers obtained in Manufacturing Example 5. Shrinkable fibers obtained by mixing the polymer 6 containing 3% of sodium methallylsulfonate followed by spinning made it possible to obtain the high pile having a post-dyeing shrinkage ratio of equal to or larger than 20 wt % and external appearance characteristics in which the height difference between the long pile portion and the short pile portion was emphasized. However, although the color development property was favorable, the relative saturation value was smaller than 0.8, which did not allow dyeing into deep colors.

Comparative Example 1

Table 2 shows the color development property, relative saturation value, post-dyeing shrinkage ratio and evaluation of pile external appearance of the shrinkable fibers obtained in Manufacturing Example 6. Shrinkable fibers obtained by mixing the polymer 7 containing no sodium methallylsulfonate followed by spinning made it possible to obtain the high pile having a post-dyeing shrinkage ratio of equal to or larger than 20% and external appearance characteristics in which the height difference between the long pile portion and the short pile portion was emphasized. However, although the relative saturation value was at least 0.8, which allowed dye exhaustion, the color development property was poor, resulting in a whitish color.

INDUSTRIAL APPLICABILITY

The modacrylic shrinkable fiber according to the present invention does not shrink very much at the time of dyeing and has a high shrinkage ratio even after the dyeing, and consequently, allows new product planning for a wide range of products such as clothing, toys (stuffed toys or the like) and interior decoration.

The invention claimed is:

1. A modacrylic shrinkable fiber manufactured from a spinning solution comprising a polymer composition obtained by mixing
50 to 99 parts by weight of a polymer (A) comprising 40 wt % to 80 wt % of acrylonitrile, 20 wt % to 60 wt % of a halogen-containing monomer and 0 wt % to 5 wt % of a sulfonic-acid-containing monomer, and
1 to 50 parts by weight of a polymer (B) comprising 5 wt % to 70 wt % of acrylonitrile, 20 wt % to 94 wt % of an acrylic ester and 16 wt % to 40 wt % of a sulfonic-acid-containing monomer comprising a methallylsulfonic acid or metal salts thereof or amine salts thereof, and no halogen-containing monomer; a total amount of the polymer (A) and the polymer (B) being 100 parts by weight;
wherein the modacrylic shrinkable fiber is capable of being dyed in deep colors at a temperature equal to or lower than 80° C. and achieving a post-dyeing shrinkage ratio treated in dry heat at 130° C. for 5 minutes of equal to or larger than 20%.

2. The modacrylic shrinkable fiber according to claim 1, wherein the methallylsulfonic acid or the metal salts thereof or the amine salts thereof in the polymer (B) is sodium methallylsulfonate.

3. The modacrylic shrinkable fiber according to claim 1, which comprises 0.01 wt % to 10 wt % of sodium methallylsulfonate in the polymer (B).

4. The modacrylic shrinkable fiber according to claim 1, which comprises 0.1 wt % to 3 wt % of sodium methallylsulfonate in the polymer (B).

5. The modacrylic shrinkable fiber according to claim 1, wherein a relative saturation value at 70° C. is at least 0.8.

6. The modacrylic shrinkable fiber according to claim 1, wherein the polymer (A) and the polymer (B) are incompatible with each other and have a sea-island structure with the polymer (A) being the sea and the polymer (B) being the islands.

7. A method for manufacturing a modacrylic shrinkable fiber, wherein
spinning is performed using a spinning solution obtained by dissolving in acetone
50 to 99 parts by weight of a polymer (A) comprising 40 wt % to 80 wt % of acrylonitrile, 20 wt % to 60 wt % of a halogen-containing monomer and 0 wt % to 5 wt % of a sulfonic-acid-containing monomer, and
1 to 50 parts by weight of a polymer (B) comprising 5 wt % to 70 wt % of acrylonitrile, 20 wt % to 94 wt % of an acrylic ester and 16 wt % to 40 wt % of a sulfonic-acid-containing monomer comprising a methallylsulfonic acid or metal salts thereof or amine salts thereof, and no halogen-containing monomer; a total amount of the polymer (A) and the polymer (B) being 100 parts by weight; drawing is performed, and dyeing is performed at a temperature equal to or lower than 80° C., thus obtaining a modacrylic shrinkable fiber having a post-dyeing shrinkage ratio being treated in dry heat at 130° C. for 5 minutes of equal to or larger than 20%.

8. The method for manufacturing a modacrylic shrinkable fiber according to claim 7, wherein water is dissolved further in the acetone.

9. The modacrylic shrinkable fiber according to claim 1, wherein 1 wt % to 40 wt % of the sulfonic-acid-containing monomer comprising the methallylsulfonic acid or the metal salts thereof or the amine salts thereof in the polymer (B) comprises
   (a) at least one sulfonic-acid-containing monomer selected from the group consisting of a methallylsulfonic acid, metal salts thereof and amine salts thereof and
   (b) at least one sulfonic-acid-containing monomer selected from the group consisting of an allylsulfonic acid, a styrenesulfonic acid, an isoprenesulfonic acid and a 2-acrylamido-2-methylpropanesulfonic acid, and metal salts thereof and amine salts thereof,
   the content of (a) is 0.01 wt % to 10 wt %, and
   the content of (a)+(b) is 1 wt % to 40 wt %.

10. The modacrylic shrinkable fiber according to claim 1, wherein 1 wt % to 40 wt % of the sulfonic-acid-containing monomer comprising the methallylsulfonic acid or the metal salts thereof or the amine salts thereof in the polymer (B) comprises
   (a) 0.01 wt % to 10 wt % of a methallylsulfonic acid, and
   (b) 15 wt % to 30 wt % of a 2-acrylamido-2-methlylproanesulfonic acid.

11. The method for manufacturing a modacrylic shrinkable fiber according to claim 7, wherein 1 wt % to 40 wt % of the sulfonic-acid-containing monomer comprising the methallylsulfonic acid or the metal salts thereof or the amine salts thereof in the polymer (B) comprises
   (a) at least one sulfonic-acid-containing monomer selected from the group consisting of a methallylsulfonic acid, metal salts thereof and amine salts thereof, and
   (b) at least one sulfonic-acid-containing monomer selected from the group consisting of an allylsulfonic acid, a styrenesulfonic acid, an isoprenesulfonic acid and a 2-acrylamido-2-methylpropanesulfonic acid, and metal salts thereof and amine salts thereof,
   the content of (a) is 0.01 wt % to 10 wt %, and
   the content of (a)+(b) is 1 wt % to 40 wt %.

12. The method for manufacturing a modacrylic shrinkable fiber according to claim 7, wherein 1 wt % to 40 wt % of the sulfonic-acid-containing monomer comprising the methallylsulfonic acid or the metal salts thereof or the amine salts thereof in the polymer (B) comprises
   (a) 0.01 wt % to 10 wt % of a methallylsulfonic acid, and
   (b) 15 wt % to 30 wt % of a 2-acrylamido-2-methylpropanesulfonic acid.

* * * * *